(12) United States Patent
Ayusawa et al.

(10) Patent No.: US 10,518,412 B2
(45) Date of Patent: Dec. 31, 2019

(54) ROBOT BEHAVIOR GENERATION METHOD

(71) Applicant: NATIONAL INSTITUTE OF ADVANCED INDUSTRIAL SCIENCE AND TECHNOLOGY, Tokyo (JP)

(72) Inventors: Ko Ayusawa, Tsukuba (JP); Eiichi Yoshida, Tsukuba (JP)

(73) Assignee: National Insitute of Advanced Industrial Science, Tokyo (JP)

(*) Notice: Subject to any disclaimer, the term of this patent is extended or adjusted under 35 U.S.C. 154(b) by 300 days.

(21) Appl. No.: 15/572,751

(22) PCT Filed: May 10, 2016

(86) PCT No.: PCT/JP2016/063844
§ 371 (c)(1),
(2) Date: Nov. 8, 2017

(87) PCT Pub. No.: WO2016/181959
PCT Pub. Date: Nov. 17, 2016

(65) Prior Publication Data
US 2018/0099411 A1 Apr. 12, 2018

(30) Foreign Application Priority Data

May 13, 2015 (JP) .................. 2015-098106

(51) Int. Cl.
G06F 19/00 (2018.01)
B25J 9/16 (2006.01)

(52) U.S. Cl.
CPC .......... B25J 9/1664 (2013.01); B25J 9/1605 (2013.01); B25J 9/1671 (2013.01); B25J 9/1697 (2013.01); G05B 2219/39254 (2013.01)

(58) Field of Classification Search
CPC combination set(s) only.
See application file for complete search history.

(56) References Cited

U.S. PATENT DOCUMENTS

| 2007/0146371 A1 | 6/2007 | Dariush |
| 2012/0143374 A1 | 6/2012 | Mistry et al. |
| 2013/0013112 A1 | 1/2013 | Darish |

FOREIGN PATENT DOCUMENTS

| JP | 2004-330361 A | 11/2004 |
| JP | 2007-125670 A | 5/2007 |

(Continued)

OTHER PUBLICATIONS

Extended European Search Report dated Dec. 4, 2018, issued in European Patent Application No. 16792684.9.

(Continued)

Primary Examiner — Bhavesh V Amin
(74) Attorney, Agent, or Firm — Workman Nydegger; Carl Reed

(57) ABSTRACT

A robot behavior generation method includes: generating a human body model; generating a robot model; creating associations between the human body model and the robot model; acquiring first motion data indicating movement of a human body model; selectively choosing movement feature indices having first unknown motion data that indicates movement of the human body model, and setting an evaluation standard for a reproduction error with respect to the normative motion data; selecting a constraint necessary for a robot to move, included in second unknown motion data that indicates the movement of the robot model; calculating first unknown motion data and second unknown motion data the reproduction errors of which based on the evaluation standard are minimum under the association and the constraint; and using the second unknown motion data to control the robot.

4 Claims, 2 Drawing Sheets

(56) References Cited

FOREIGN PATENT DOCUMENTS

JP  2013-520327 A  6/2013
JP  5892531 B1  3/2016

OTHER PUBLICATIONS

Kanako Miura et al., *Robot Motion Remix Based on Motion Capture Data Towards Human-Like Locomotion of Humanoid Robots*, 9th IEEE-RAS International Conference on Humanoid Robots, Dec. 2009, pp. 596-603.

Shin'ichiro Nakaoka et al., *Interaction Mesh Based Motion Adaption for Biped Humanoid Robots*, Proc. of the IEEE-RAS International Conference on Humanoid Robots, 2012, pp. 625-631.

Ko Ayusawa et al., *Fast Inverse Kinematics Algorithm for Large DOF System with Decomposed Gradient Computation Based on Recursive Formulation of Equilibrium*, IEEE/RSJ International Conference on Intelligent Robots and Systems, Oct. 2012, pp. 3447-3452.

Ko Ayusawa et al., *Simultaneous Global Inverse Kinematics and Geometric Parameter Identification of Human Skeletal Model from Motion Capture Data*, Mechanism and Machine Theory, vol. 74, 2014, pp. 274-284.

International Preliminary Report on Patentability dated Nov. 23, 2017, issued in PCT/JP2016/063844, filed May 10, 2016.

ROBOT BEHAVIOR GENERATION METHOD

TECHNICAL FIELD

The present invention relates to a method of generating behavior of a robot.

BACKGROUND ART

Heretofore, a technique called motion retargeting has been developed which reproduces behavior of a human as behavior of a different character such as a computer graphic character. Moreover, this technique has been applied also to humanoid robots, which have high physical similarity to the human, by using a behavior conversion technique as described in PTL 1.

Here, NPL 1 and NPL 2 disclose techniques using errors from motion capture marker data and shape feature amounts as indices for reproducing behavior of a human on a humanoid robot.

Also, according to these literatures, this reproduction needs to take into account constraint conditions on the ranges of motion of the joints of the humanoid robot, the balance of its center of gravity, and the like. It is also typical to employ a method involving converting motion indices of a human body model into behavior of a robot, and then applying a correction reflecting the constraint conditions.

Meanwhile, NPL 3 describes a method of identifying geometric parameters for expressing the skeleton of a human body model, and NPL 4 describes an inverse kinetics calculation method for robots and human body models with a large degree of freedom.

CITATION LIST

Patent Literature

PTL 1: Japanese Patent Laid-Open No. 2007-125670

Non Patent Literatures

NPL 1: K. Miura, M. Morisawa, S. Nakaoka, F. Kanehiro, K. Harada, K. Kaneko, and S. Kajita, "Robot motion remix based on motion capture data towards human-like locomotion of humanoid robots", Proc. of the IEEE-RAS Int. Conf. on Humanoid Robots, pp. 596-603, December 2009

NPL 2: S. Nakaoka and T. Komura, "Interaction mesh based motion adaptation for biped humanoid robots", Proc. of the IEEE-RAS Int. Conf. on Humanoid Robots, pp. 625-631, 2012 NPL 3: K. Ayusawa and Y. Nakamura, "Fast inverse kinematics algorithm for large dof system with decomposed gradient computation based on recursive formulation of equilibrium", Proc. of the IEEE/RSJ Int, Conf. on Intelligent Robots and Systems, pp. 3447-3452, 2012

NPL 4: K. Ayusawa, Y. Ikegami, and Y. Nakamura, "Simultaneous global inverse kinematics and geometric parameter identification of human skeletal model from motion capture data", Mechanism and Machine Theory, Vol, 74, pp. 274-284, 2014

SUMMARY OF INVENTION

Technical Problem

However, a problem with the above-described method involving converting motion indices of a human body model into behavior of a robot and then applying a correction reflecting the above-mentioned constraint conditions is that the motion indices cannot be adjusted with the constraint conditions taken into consideration, and therefore the correspondence between behavior of the human and behavior reproduced by the robot is not always optimized.

The present invention has been made to solve this problem, and an object thereof is to provide a robot behavior generation method having enhanced accuracy in reproducing behavior of a human.

Solution to Problem

To solve the above-mentioned problem, the present invention provides a robot behavior generation method of reproducing behavior of a human body with a robot, comprising: a first step of generating a human body model by modeling a structure of the human body; a second step of generating a robot model by modeling a structure of the robot; a third step of associating the human body model generated in the first step and the robot model generated in the second step with each other; a fourth step of acquiring normative motion data indicating movement of the human body model corresponding to behavior of the human body; a fifth step of setting an evaluation standard for a reproduction error with respect to the normative motion data generated in the fourth step, by sorting out motion feature indices included in first unknown motion data indicating movement of the human body model generated in the first step; a sixth step of selecting a constraint condition necessary for the robot to move, the constraint condition being included in second unknown motion data indicating movement of the robot model generated in the second step; a seventh step of calculating the first unknown motion data and the second unknown motion data the reproduction errors of which are minimum based on the evaluation standard set in the fifth step under the association created in the third step and the constraint condition selected in the sixth step; and an eighth step of controlling the robot by using the second unknown motion data calculated in the seventh step.

Advantageous Effect of Invention

According to the present invention, a robot behavior generation method having enhanced accuracy in reproducing behavior of a human can be provided.

DESCRIPTION OF EMBODIMENTS

Figure 1:
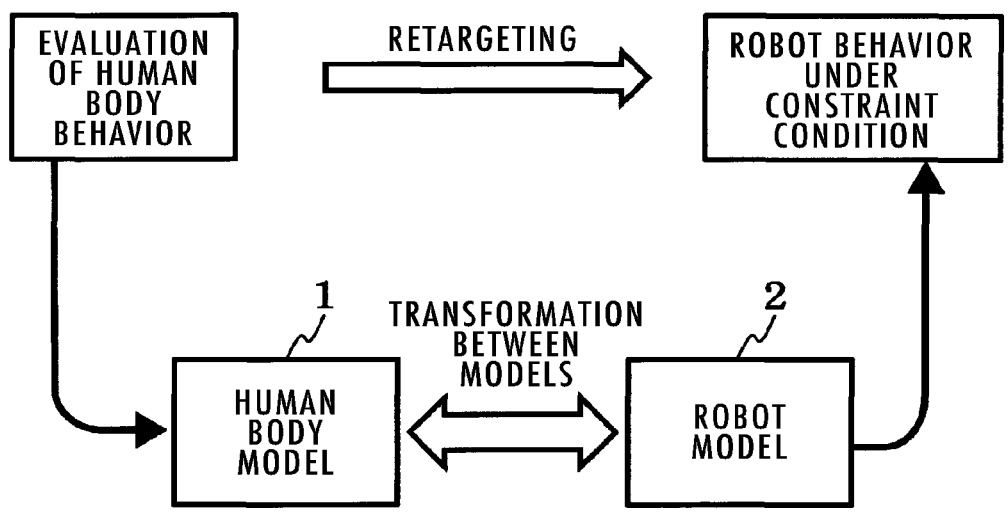
FIG. 1 is a diagram for describing an overview of a robot behavior generation method according to an embodiment of the present invention.

An embodiment of the present invention will be described below in detail with reference to the drawings. Note that identical reference signs in the drawings represent identical or equivalent portions.

FIG. 1 is a diagram for describing an overview of a robot behavior generation method according an embodiment of the present invention. The overview of the robot behavior generation method according to the embodiment of the present invention will be described below with reference to FIG. 1.

Humanoid robots, which have physical similarity to the human (hereinafter referred to as "humanoids"), have been expected to be human physical simulators for implementing body control systems and somatic sensation close to the human's. For this reason, in the case of using a humanoid as a human physical simulator in a motion analysis, human behavior is desired to be reproduced on the humanoid as originally as possible without being processed.

However, the humans and humanoids are different in physical mechanism and mechanical properties involved in making motions. Thus, these differences need to be compensated somehow.

For this reason, a technique called retargeting is important, which, as illustrated in FIG. 1, allows human body behavior to be adjusted for a humanoid and reproduced as robot behavior while performing the above-mentioned compensation.

Moreover, in applications using a humanoid as a human physical simulator in a motion analysis, it is desired to be able to directly evaluate how human motion features are saved and modified.

To satisfy these demands, as illustrated in FIG. 1, human motion data is acquired which is optimized under a mapping condition between physical parameters of a human body model 1 and a robot model representing their physical structures and a geometrical and mechanical constraint condition such as robot motion restrictions on performing motion control and tasks. Then, robot motions are generated using parameters calculated in this optimization.

Note that the above-mentioned mapping condition refers, for example, to nonlinear functions for later-described parameters involved in motions, and a condition that the human and the robot shares the same value for some of the parameters.

Also, the above-mentioned robot motion restrictions mean, for example, restrictions on the robot regarding the allowed ranges of joint angles, the upper and lower limits of joint angular speeds, the upper and lower limits of joint angular accelerations, the upper and lower limits of joint torques, on-ground conditions concerning the positions and postures of the support feet, the allowed range for the center of gravity, the range of presence of the center of pressure on the bottom of each foot, and so on.

According to the above robot behavior generation method, in a case where the parameters involved in human motions and humanoid motions are independent variables, motion recovery problems, morphing, and motion planning in a human motion analysis can be solved at the same time.

Note that the above-mentioned parameters involved in motions include, for example, for both the human and the robot, the joint angles, joint angular speeds, and joint angular accelerations, angles that determine the positional coordinates and postures of later-described links that serve as bases, speeds and accelerations for the above-mentioned positional coordinates and the above-mentioned angles, geometric parameters, and mechanical parameters.

Here, the above-mentioned geometric parameters include, for example, the relative positions of adjacent joint origins and the relative postures of adjacent joint axes or a virtual robot's joint angles. On the other hand, the above-mentioned mechanical parameters include, for example, the mass, center of gravity, and inertial tensor of each of the above-mentioned links.

From the above, according to the above-described robot behavior generation method, an evaluation function for human motions is directly optimized with the constraint condition on robot motions taken into account. Hence, it is possible to implement reproduced behavior with a robot that is very faithful to and more accurate with the measurement target individual's original behavior, such as how the human body's four limbs and torso are moved.

Also, according to this robot behavior generation method, it is possible to check how biomechanical human motion feature indices with respect to the measured human motion data acquired are saved or modified with the above-described optimization. This makes it easy to sort out the above-mentioned motion feature indices to be reflected on the above-mentioned reproduction.

Here, the above-mentioned motion feature indices are, for example, least square errors in a case of recovering the motion indicated by the above-mentioned measured motion data by using the above-mentioned parameters involved in motions. Note that in the field of computer graphics (CG), the least square errors may be replaced with errors in moment feature amounts that can be figured out from the measured motion data or in geometric-mechanical feature amounts such as Laplacian deformation energy.

Also, loads such as joint input torque and external force in the field of biomechanics may be minimized using the above-mentioned motion feature indices.

Further, according to this robot behavior generation method, human motion data optimized as described above can be compared with test data obtained with a robot. Thus, the robot behavior generation method is particularly useful in a case where a humanoid is used actively for product evaluation, that is, a case where a humanoid is used as a dummy doll for simulating human motion functions, such as a case where the humanoid wears a product developed for humans and reproduces human behavior.

Figure 2:
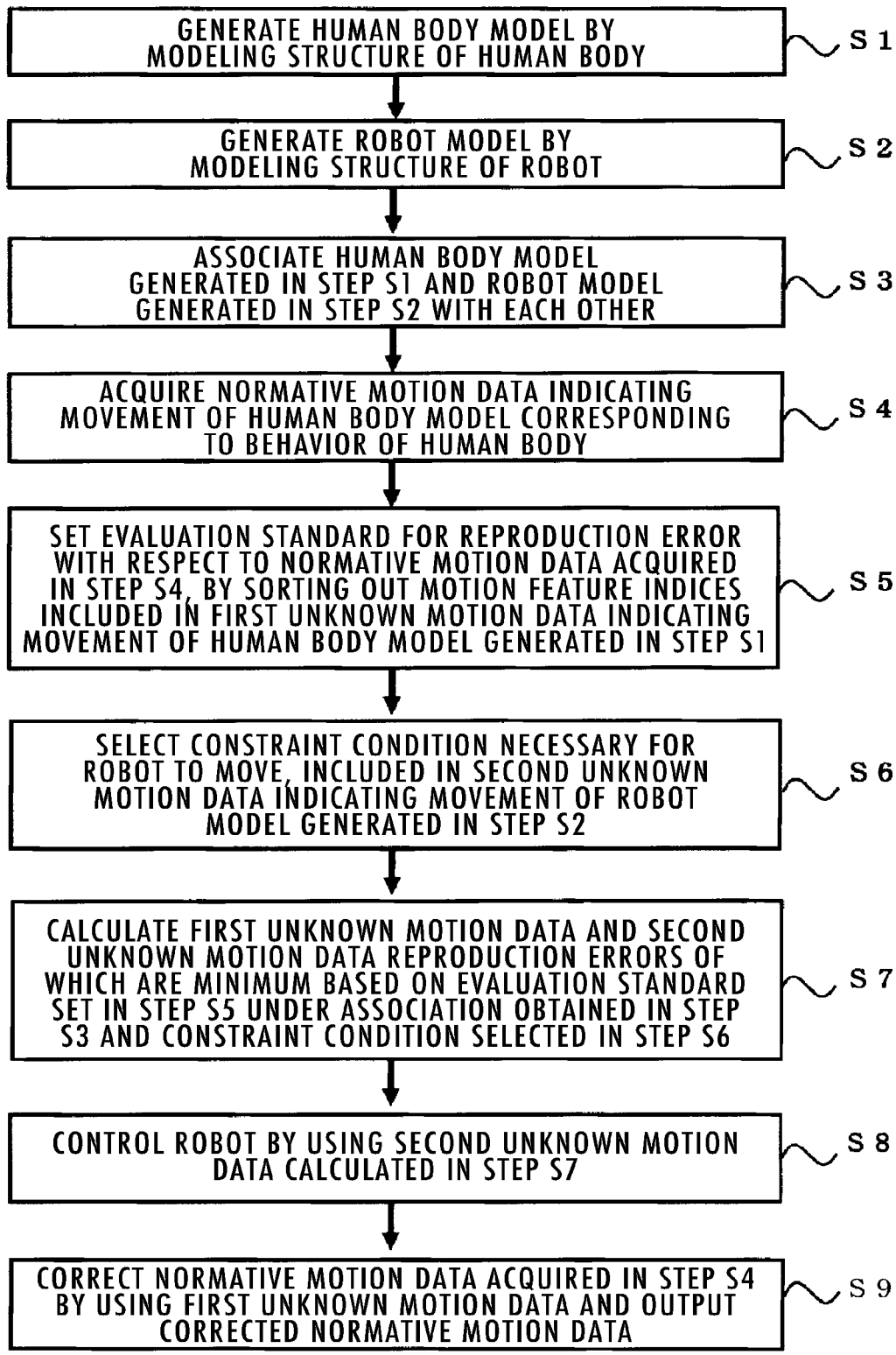
FIG. 2 is a flowchart illustrating the robot behavior generation method illustrated in FIG. 1.

FIG. 2 is a flowchart illustrating the robot behavior generation method illustrated in FIG. 1. The robot behavior generation method according to the embodiment of the present invention will be specifically described below with reference to FIG. 2.

As illustrated in FIG. 2, in step S1, a human body model 1 is generated by modeling the structure of a human body. Various methods are employable for this modeling. In this case, the human body is modeled as a multi-link system obtained by connecting a plurality of constituent elements, for example, and a generalized coordinate of the human link system is defined as qh.

Then in step S2, a robot model 2 is generated by modeling the structure of a robot. Various methods are employable for this modeling as well. In this case, the robot is modeled as a multi-link system similar to the above-mentioned human body, for example, and a generalized coordinate of the robot link system is defined as qr.

In step S3, the human body model 1, generated in step S1, and the robot model 2, generated in step S2, are associated with each other. Here, the above-mentioned generalized coordinates of the human and the robot are associated with each other by, for example, the following relational equation g for morphing.

Math. 1

$$g(q_r, q_h, \phi) = 0 \tag{1}$$

Note that $\phi$ described in equation (1) is an unknown geometric parameter representing the human's skeleton, and the robot's geometric parameter is known.

Then in step S4, normative motion data Ph indicating movement of the human body model corresponding to behavior of the human body is acquired. Here, the normative motion data Ph includes, for example, motion capture marker data, ground reaction force data, and data of a myoelectric potential measurement device.

In step S5, an evaluation function is designed for which the above-mentioned biomechanical human motion feature indices are sorted out and which is capable of evaluating similarity to first unknown motion data expressed by the generalized coordinate qh and the geometric parameter φ of the human model generated in step S1, in order to perform behavior recovery with respect to the normative data Ph, acquired in step S4.

In step S6, a constraint condition necessary for the robot to actually implement behavior is determined for second unknown motion data expressed by the generalized coordinate qr of the robot model generated in step S2.

Then in step S7, the first unknown motion data and the second unknown motion data are calculated which have the smallest reproduction errors with respect to the normative motion data Ph, acquired in step S4, under the morphing relational equation designed in step S3 and the constraint condition determined in step S6, by using the evaluation functions of step S5.

In one example, a vector Qh and a vector Qr obtained by plotting time-series data qh,t and time-series data qr,t (1≤t≤NT) on the generalized coordinates of the human and the robot at discrete times t1, t2, . . . , tNT are defined by the following equation (2).

Math. 2

$$Q_h \triangleq [q_{h,1}^T \ldots q_{h,N_T}^T]^T, Q_r \triangleq [q_{r,1}^T \ldots q_{r,N_T}^T]^T \quad (2)$$

In this case, the first unknown motion data on the human body model corresponds to the geometric parameter φ and the vector Qh, while the second unknown motion data on the robot model corresponds to the vector Qr.

Then, the following inequality constraint condition is considered which should be satisfied for the vector Qr when the robot stands on its feet to perform robot motion planning.

Math. 3

$$h(Q_r) \le 0 \quad (3)$$

Here, h in inequality (3) means a kinetic function for, for example, the range of joint motion and joint speed, the center of gravity, the zero-moment point (ZMP), or the like.

Also, behavior recovery problems with respect to the measured human motion dataset Ph in a motion analysis are generalized as follows.

Math. 4

$$\min_{Q_h, \phi} f(P_h, Q_h, \phi) \quad (4)$$

Note that f in expression (4) is an evaluation function and, for example, an error norm that can be calculated from a marker position measured and a marker position on the model or the like is used. Here, expression (4) is a combined problem involving human joint trajectory estimation and geometric parameter identification.

With the above taken into consideration, the above-mentioned retargeting problem is formulated as follows as an optimization problem for the above-mentioned evaluation function f for human behavior recovery under equation (1), indicating the relation in morphing between the human and the robot, and inequality (3), indicating the robot motion constraint condition.

Math. 5

$$\min_{Q_h, Q_r, \phi} f(P_h, Q_h, \phi) \quad (5)$$
$$\text{where } g'(Q_h, Q_r, \phi) = 0, h(Q_r) \le 0$$

Note that g' in expression (5) is an aggregation of equations (1) satisfied by pieces of time-series data.

As described above, an optimization problem is solved taking into account inequality (3), which indicates the constraint condition for implementing robot actions. That is, the evaluation function for human motion recovery is optimized without separating the morphing and the motion planning problem but by using the form of expression (5). In this way, how human motion features are saved or modified can be evaluated.

Here, the optimization problem described in equation (5) would involve a huge amount of calculation if a directly solving method were employed. However, the calculation speed can be increased by, for example, applying an approximate calculation such as a penalty function method to inequality (3).

Also, in the entire time-series data mentioned above, the above-mentioned geometric and mechanical parameters are originally constants. However, it is effective to handle them as time-varying parameters and approximate them as independent subproblems at given times.

Then in step S8, the robot is controlled using the second unknown motion data Qr, calculated in step S7.

Here, it is inevitable that behavior reproduced by the robot is changed to some extent from modeled behavior of the human based on the above-mentioned constraint condition. However, conventional behavior reproducing techniques using a robot only allow comparison between modeled behavior of a human and behavior reproduced by the robot. It is difficult to check how the modeled human behavior is changed by the behavior reproducing techniques.

For this reason, in step S9, the normative motion data Ph, acquired in step S4, is corrected using the optimized first unknown motion data Qh, and new human motion data is outputted.

Math. 6

$$P^*_h = \hat{P}_h(Q_h, \phi) \quad (6)$$

Here, in equation (6), P^h is a function for estimating human motion data from the first unknown motion data Qh and the geometric parameter φ, and P*h is the corrected human normative motion data. Further, as the function P^h for estimating human motion data, a forward kinetics calculation function is used which calculates the position of a characteristic point from the human body model and the unknown motion data, for example.

A more specific example of the above-described robot behavior generation method will be described below.

The following will assume that, in the designing of the relation between the human body model 1 and the robot model 2, the robot's joint pairs are formed only of rotary joints, and the joint pairs in both models identically correspond to each other. Also, the geometric parameter φ of the human body model 1 is expressed with the joint pairs of the robot. Further, the distance between these joints is assumed as a slide joint connecting them, for example. In this case, as described in NPL 4 listed above, the geometric parameter φ can be expressed as a virtual generalized coordinate of the robot.

Here, the generalized coordinate qh of the human body model and the generalized coordinate qr of the robot model are expressed by the following equation (7) and equation (8), respectively.

Math. 7

$$q_h = [p_h^T \xi_h^T \theta_h^T]^T \quad (7)$$

Math. 8

$$q_r = [p_r^T \xi_r^T \theta_r^T]^T \quad (8)$$

Here, ph and pr mean the positions of the base links of the human body model and the robot model, respectively, ξh and ξr mean the postures (quaternion notation) of the base links of the human body model and the robot model, respectively, and θh and θr mean the joint angles of the human body model and the robot model, respectively.

Then, the correspondence between the generalized coordinates of the robot model and the human body model is designed as follows.

Math. 9

$$\theta_h = \theta_r \quad (9)$$

Only the joint angles are common here. The positions and postures of the base links of the human body model and the robot model are not common but remain as degrees of freedom for motion constraints for the robot itself.

Then, the conditions described in the following inequalities (10) to (12) are considered for the limits on the range of motion, speed, and acceleration related to the robot joint angle.

Math. 10

$$\theta_{r,min} \leq \theta_r \leq \theta_{r,max} \quad (10)$$

Math. 11

$$\dot{\theta}_{r,min} \leq \dot{\theta}_r \leq \dot{\theta}_{r,max} \quad (11)$$

Math. 12

$$\ddot{\theta}_{r,min} \leq \ddot{\theta}_r \leq \ddot{\theta}_{r,max} \quad (12)$$

Meanwhile, in the entire time-series data of the human motion data, whether or not the foot or feet are on the ground is already known, and a position ph, zmp of the zero-moment point can be measured or estimated in advance. Also, the bottoms of the feet of the robot are flat surfaces, and the XY plane for the feet link coordinates is parallel to the flat surfaces on the bottoms of the feet.

The human on-ground condition in the entire time-series data is the target on-ground state in the robot motion planning, and the following condition is assumed at times when the foot links are on the ground.

Math. 13

$$[0\ 0\ 1] R_{r,foot} [0\ 0\ 1]^T = 1 \quad (13)$$

where $R_{r,foot} \in R^{3 \times 3}$(foot=rfoot,lfoot) \quad (13)

Math. 14

$$\dot{p}_{r,foot} = 0 \quad (14)$$

where $p_{r,foot} \in R^3$

Note that Rr,foot and pr,foot described above are position and posture matrices in the inertial coordinate system for the right foot link or the left foot link coordinate. Also, the following condition is further added for times when both foot links are on the ground.

Math. 15

$$[0\ 0\ 1](p_{r,lfoot} - p_{r,rfoot}) = 0 \quad (15)$$

The position ph,zmp of the ZMP of the human in each piece of time-series data is used as a target value for the ZMP in the robot motion planning. However, in a case where the position ph,zmp goes outside the support polygon of the bottoms of the feet of the robot in the immediately previous time, the ZMP target value is changed to the nearest point within the support polygon. The ZMP target value for the robot to be finally used is a position pr,zmp.

The ZMP can be analytically described from the equation of motion for the base link. However, the ZMP is approximated using the equation of motion for an inverted pendulum whose support point is the position pr,zmp, which is the ZMP target value, and this is used as a constraint condition.

Math. 16

$$\ddot{p}_c = \frac{g}{p_{c,z}}(p_c - p_{zmp}) \quad (16)$$

where $p_o \in R^2$

Note that pc means the position of the center of gravity of the entirety, pc,z means its z component, and g means the gravitational acceleration.

The following restriction is also given for the allowed range for the center of gravity in order to preferentially guarantee static stability in a situation where a complicated posture is assumed regardless of the ZMP target value calculated from the human motion data.

Math. 17

$$p_c \subset P \quad (17)$$

where P is the allowed range for the center of gravity

Note that the XY region is set to coincide with the support region for the bottoms of the feet.

Here, assume that NM marker observables pi,tref (1≤t≤NM) are given for the discrete times t1, t2, . . . , tNT. The following evaluation function is used for the generalized coordinate qh,t (1≤t≤NT) of the human body model at each time.

Math. 18

$$f(Q_h, \phi) \triangleq \frac{1}{2} \sum_{t=1}^{N_T} \sum_{i=1}^{N_M} \left\| p_i(q_{h,t}) - p_{i,t}^{ref} \right\|^2 \quad (18)$$

Note that in equation (18), pi is the position of a marker defined on the human body model and is a function with qh and the geometric parameter φ and can be figured out through forward kinetics calculation.

Directly solving equation (18) for the time-series motion data Qh, Qr and the geometric constant φ would involve a huge amount of calculation. Thus, equation (18) is solved as follows using a penalty function method on the equality restriction condition in expression (5).

Assume that differentiation of a variable at a time t can be explicitly expressed as a finite difference from the immediately previous time (t−1).

Math. 19

$$\dot{x}_t = \frac{1}{\Delta t}(x_t - x_{t-1}) \qquad (19)$$

Math. 20

$$\omega_t = K(\xi_t)\frac{1}{\Delta t}(\xi_t - \xi_{t-1}) \qquad (20)$$

Note that $K(\xi t)$ is a matrix that converts the differential value of a quaternion into an angular speed ω, and equation (20) is used for differentiation for posture while equation (19) is used otherwise.

Here, using a method of identifying a human body model's geometric parameter described in NPL 4 listed above, a human body parameter is identified independently of the retargeting. The identified parameter is defined as $\phi'$.

Then, penalty terms are added to a time-varying geometric parameter $\phi t$. Here, expression (5) is approximated by solving the following inverse kinetics problem in the order of the time-series data.

Math. 21

$$\min_{q_{h,t},\, q_{r,t},\, \phi_t} \frac{1}{2}\sum_{i=1}^{N_M} \left\| p_i(q_{h,t} \cdot \phi_t) - p_{i,t}^{ref} \right\|^2 + \omega_\phi \|\phi_t - \phi'\|^2 + \omega_{g_k} \sum_k \|\min(0, g_k)\|^2 \qquad (21)$$

Note that in expression (21), gk means individual inequality conditional expressions converted from equations and inequalities (9) to (17), and k means the ordinal numbers given to equations and inequalities (9) to (17). Also, ωφ and ωgk are weights on the penalty terms.

Then, expression (21) is solved using an inverse kinetics calculation method for a large degree of freedom described in NPL 3 listed above, the time-series motion data qr,t on the robot is acquired, and the robot is controlled using the acquired time-series motion data qr,t.

According to the above-described retargeting method capable of explicitly incorporating evaluation used in motion recovery in a human motion analysis, it is possible to obtain an optimum solution to a combined problem including a human motion recovery problem, physical morphing between the human and the robot, and a robot motion planning problem.

Also, not only the trajectory of a motion of the robot but also the trajectory of the motion and physical parameters of the human body model corresponding thereto can be calculated at the same time.

Further, since the method directly optimizes the evaluation function for motion recovery by the robot, it is possible to easily evaluate change in design that saves or modifies features of a human motion.

On the other hand, by using the above-mentioned trajectory of the motion and physical (geometric) parameters of the human body model, the human normative motion data can be corrected and outputted. For example, by using the function pi in equation (18), a corrected time series of marker motions can be outputted.

Thus, by using the corrected normative motion data, it is possible to directly compare a portion of the human body model before a change is made thereto and the portion after the change is made thereto. Also, by biomechanically analyzing the corrected normative motion data, for example by calculating the joint angle using forward kinetics calculation or estimating the joint torque using inverse kinetics calculation, how motion features change can be quantitatively compared more specifically between before and after the above-mentioned change is made.

Note that it is needless to say that the robot behavior generation method according to the embodiment of the present invention is applicable not only to the above-mentioned human or human body and but similarly to other animals whose motions can be analyzed. In such a case, the humanoid is considered a robot replicating the animal instead.

REFERENCE SIGNS LIST

1 human body model
2 robot model

The invention claimed is:

1. A robot behavior generation method of reproducing behavior of a human body with a robot, comprising:
    a first step of generating a human body model by modeling a structure of the human body;
    a second step of generating a robot model by modeling a structure of the robot;
    a third step of associating the human body model generated in the first step and the robot model generated in the second step with each other;
    a fourth step of acquiring normative motion data indicating movement of the human body model corresponding to behavior of the human body;
    a fifth step of setting an evaluation standard for a reproduction error with respect to the normative motion data acquired in the fourth step, by sorting out motion feature indices included in first unknown motion data indicating movement of the human body model generated in the first step;
    a sixth step of selecting a constraint condition necessary for the robot to move, the constraint condition being included in second unknown motion data indicating movement of the robot model generated in the second step;
    a seventh step of calculating the first unknown motion data and the second unknown motion data the reproduction errors of which are minimum based on the evaluation standard set in the fifth step under the association obtained in the third step and the constraint condition selected in the sixth step; and
    an eighth step of controlling the robot by using the second unknown motion data calculated in the seventh step.

2. The robot behavior generation method according to claim 1, further comprising a ninth step of correcting the normative motion data by using the first unknown motion data and outputting the corrected normative motion data.

3. The robot behavior generation method according to claim 1, wherein in the first step, the structure of the human body is modeled by using a time-varying parameter.

4. The robot behavior generation method according to claim 1, wherein in the seventh step, the first unknown motion data and the second unknown motion data are calculated by using a penalty function method.

* * * * *